June 16, 1931.  T. C. ENGLUND  1,810,163
ANIMAL TRAP
Filed June 9, 1930  2 Sheets-Sheet 1
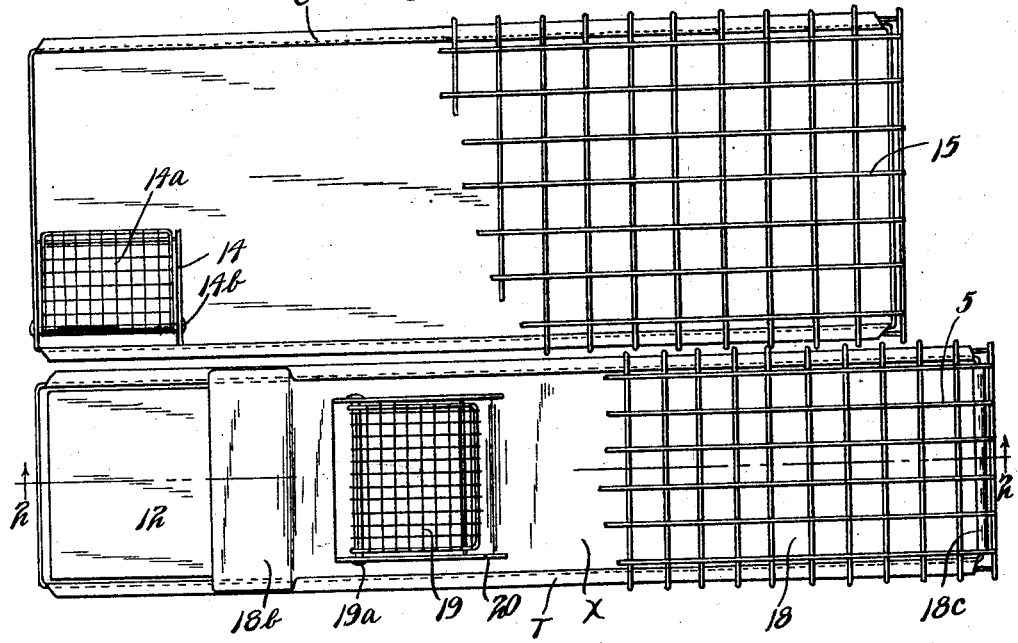
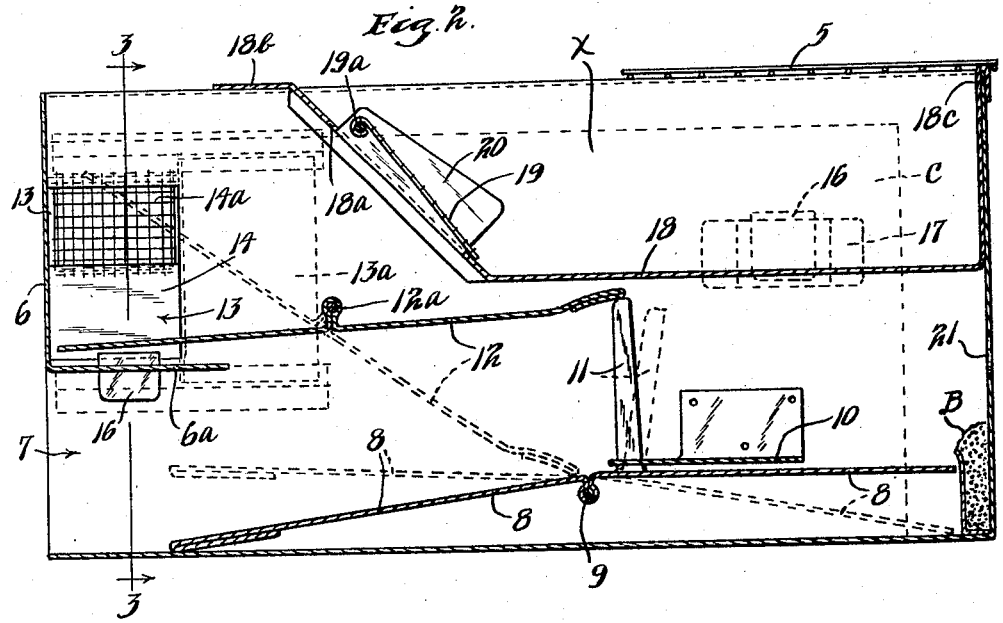
INVENTOR.
THEODORE C. ENGLUND.
BY HIS ATTORNEYS.
Williamson & Williamson

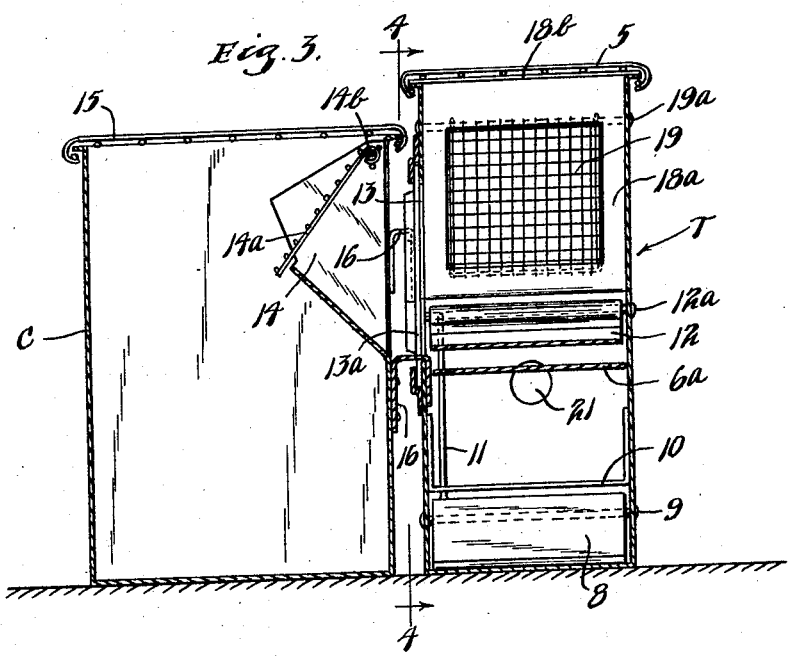
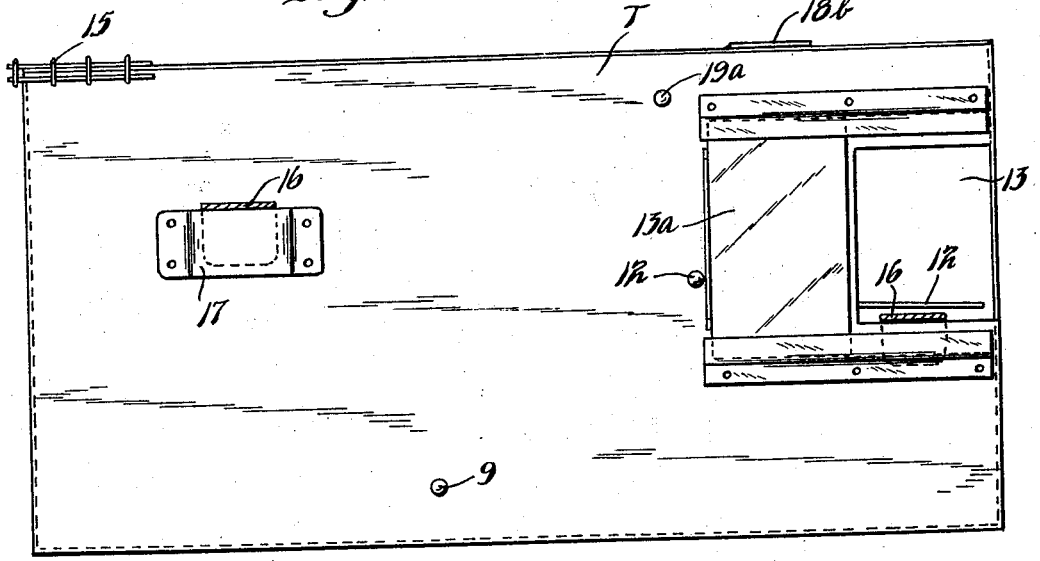

Patented June 16, 1931

1,810,163

UNITED STATES PATENT OFFICE

THEODORE C. ENGLUND, OF MINNEAPOLIS, MINNESOTA

ANIMAL TRAP

Application filed June 9, 1930. Serial No. 459,906.

This invention relates to animal traps and, while the embodiment illustrated in the accompanying drawings is especially adapted for small animals, such as mice and other rodents, is equally well adapted for trapping larger animals.

It is an object of my invention to provide a compact, a simple and highly efficient animal trap which will automatically re-set itself after an animal passes into the confinement or captive chamber and which will not injure or mutilate the captured animal.

It is a further object to provide a trap of the class described wherein the animals are imprisoned in a live state and may consequently be drowned or otherwise destroyed, without contaminating the trap with blood and thereby making other animals reluctant to go into the trap.

Another object is to provide a highly efficient trap which will re-set itself automatically, which is comprised of a minimum number of parts compactly arranged and wherein a tilting platform serves the several functions of preventing escape by way of the entrance when the trap is tripped, furnishing an inclined approach to the entrance to the confinement or captive chamber and re-setting the trap and re-opening the entrance when the animal has traveled across the pivot of said platform.

These and other objects and advantages of the invention will be fully set forth in the following description made in connection with the accompanying drawings, in which like reference characters refer to similar parts throughout the several views, and in which:—

Fig. 1 is a plan view of the embodiment of my invention with some portions of the reticulated covers broken away;

Fig. 2 is a vertical section taken on the line 2—2 of Fig. 1, certain of the dotted lines indicating the tripped position of the trip platform and tilting platform;

Fig. 3 is a cross section taken on the line 3—3 of Fig. 2; and

Fig. 4 is a cross section taken on the line 4—4 of Fig. 3 showing the inner wall of the trapping casing in side elevation.

In the embodiment of the invention illustrated I provided a relatively narrow box-like trapping casing T and a captive cage C disposed in juxtaposition to one of the longitudinal vertical sides of casing T and preferably detachably connected therewith.

The trapping casing T has closed sides and ends and a suitable bottom and is preferably provided with a detachable cover 5 which may be constructed of netting or other reticulated material and which is, as shown, slidable upon longitudinal flanges provided at the upper edges of said casing. The front end 6 of the casing is provided with a relatively small entrance 7 which may be conveniently formed by cutting the edges of said wall and inturning the cut portion to form a horizontal partition 6a at the top of the entrance. Adjacent the bottom of the trapping casing an elongated trip platform 8 is mounted, being of slightly less width than the width of the casing and pivoted to the sides of the casing by a horizontal rod 9. The forward end of trip platform 8 is weighted or constructed heavier than the rearward end and is normally positioned as illustrated in full lines in Fig. 2. A fixed horizontal platform 10 is mounted between the sides of the casing T and positioned directly above the rear portion of trip platform 8 extending from a point adjacent the pivot 9 to a point approximately midway between the pivot and the rear end of platform 8. The fixed platform 10 is provided for the purpose of supporting the animal, until it has traveled to a point adjacent the rear of casing T where it will not interfere with the tripping of the tilting platform.

Trip platform 8 rigidly carries an upstanding trip arm 11 which is adapted to normally support the rear edge of my tilting platform 12. Tilting platform 12 is disposed some distance above trip platform 8 extending normally parallel thereto and being pivoted on a horizontal rod 12a which traverses the longitudinal sides of casing T. The rear end of tilting platform 12 is weighted or constructed slightly heavier than the forward end and the forward end is disposed directly above the short horizontal bar or partition 6a at the top of the entrance.

An exit opening 13 is formed in the forward portion of the inner side wall of trapping casing T, disposed above the top partition 6a of the entrance. A sliding door 13a may be provided on the exterior of the said side wall of casing T for closing the exit when it is desired to detach the captive cage C.

Cage C has an entrance 14 which registers with exit opening 13 of casing T when the cage and casing are attached and said entrance may have an inclined tread portion leading to a reticulated outwardly opening door 14a which may be conveniently constructed of wire netting and which is hinged at its upper edge on a rod 14b.

Cage C may have a removable cover 15 constructed, if desired, of wire netting which will permit captive animals to be removed through the open top of the cage. Attachment elements, such as downwardly curved hooks 16 are provided on the inner wall of cage C adapted to engage cooperating attachment elements, such as the strap 17 and the lower edge of exit opening 13 in the opposing or inner wall of the trapping casing T.

As illustrated, a second captive or confinement chamber X may be provided in the upper and rearward portion of trapping casing T. This chamber may be formed by means of a removable partition 18 which has a declined forward end 18a having a doorway therein just above the level of tilting platform 12 when said platform is in the normal position. As shown in Fig. 2, the door opening in the end 18a of said partition is provided with a swinging door 19 which is preferably reticulated and hinged at its upper end to a transverse rod 19a. The door opens inwardly of the chamber X to permit the animal to enter the confinement chamber and to prevent escape.

At the sides of the said doorway I prefer to provide upstanding flanges 20 which extend in vertical planes for the purpose of preventing an animal already in the confinement chamber X from escaping when another animal is entering the chamber. The pivot rod 19a may be fixed in the upper ends of flanges 20.

Compartment-forming partition 18 is detachably supported from the top of trapping casing T by means of a slightly widened integrally formed plate 18b at its upper and forward edge and a downturned flange 18c at its rear edge, which flange hooks over the upper edge of the rear wall of casing T. When the cover 5 of the trapping casing is removed partition 18 may be lifted off the upper edge of the casing.

The rear end of casing T may be provided with an opening 21 through which bait may be placed upon the rear end of the trip platform 8, or in a bait holder at the rear end of casing T.

*Operation*

In operation the trap is set by depressing the forward end of tilting platform 12 with a rod projected through the open cover of trap casing X, this causing the trip arm 11 to be disposed below the rear or weighted end of tilting platform 12 engaging the rear edge of said platform and holding the same in the position shown in full lines in Fig. 2.

Bait B, such as flour or cheese, is disposed at the rear of trip platform 8 through the aperture 21 in the rear end of casing T.

The animal attracted by the bait and also by the desire to explore a dark hole or recess, such as the entrance of the trap, walks into entrance 7 and treads upon the forward portion of trip platform 8. The animal then proceeds to cross stationary platform 10 and then steps upon the rear portion of trip platform 8 tripping the tilting platform 12 by disengagement of arm 11 with the rear edge thereof. The trip platform and tilting platform are then disposed in positions indicated by the dotted lines in Fig. 2 and it will be seen that the entrance to the trap is then completely obstructed by tilting platform 12.

In the inclined or tripped position, tilting platform 12 serves the function of an inclined approach to the two exits of the trapping chamber. The animal after exploring the trapping chamber, will climb the inclined approach and when it passes the pivot rod 12a, tilting platform 12 will swing to the normal, substantially horizontal position and trip platform 8 will swing to normal position, causing the trip arm 11 to again be disposed below the rear edge of the tilting platform to support the same and reset the trap. The animal will then seek escape either through the door 14a or through the door 19, it being noted that these doors admit light and therefore attract the animal. The animal can push the door outwardly and will pass either into the captive cage C or into the confinement chamber X, as the case may be.

From the foregoing description it will be seen that the trap is automatically reset by the animal at the time the animal works its way forwardly of the pivot rod 12a of the tilting platform 12. Several animals may therefore be captured without removing the first and without resetting the trap.

The captured animals in cage C may be removed by disengaging the hooks or other attachment elements 16 and their cooperating attachment elements on the trapping casing and the cage with the animals therein may be immersed in water, if desired, and the animals drowned. In removing the cage, the sliding door 13a for the trapping casing exit is preferably closed whereby the trapping casing with the elements therein constitutes a complete trap in itself until the cage is re-attached.

Attention is called to the simplicity of my device and the several functions performed by the tilting platform 12. Said platform serves to define the top of the entrance when in the normal set position; swings to inclined position to obstruct the entrance when the device is tripped; functions as an inclined approach when the animal is trapped and subsequently resets the trap when the animal has passed forwardly of the pivot rod 12a, also confining the animal in the chamber at the upper and forward portion of casing T.

The compartment-forming partition 18 may be readily removed for cleaning the trip platform and tilting platform.

From the foregoing description it will be seen that I have invented a compact and highly efficient trap adapted for wide general use and capable of being manufactured at relatively low cost. It will be apparent that either the captive cage C or the confinement compartment X may be eliminated if desired, although I prefer to utilize both compartments to increase the capacity of my device.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claims. In the appended claims the word "enclosure" is used to denote any type of casing, cage, or reticulated housing.

It will be further noted that at the time an animal passes from the tilting platform 12 into either of the confinement or captive chambers there will be no movement or swinging of parts below his feet and nothing will be present to frighten him, consequently, in actual practice, the animal does not hesitate to pass into the confinement chamber, but does so almost immediately after the trap has been reset by the re-tilting of platform 12 into horizontal position.

What is claimed is:—

1. In an animal trap, an enclosure having an entrance, a tread-operated tripping device disposed inwardly of said entrance, a tilting platform pivoted above said tripping device and having a relatively heavy inner end adapted to swing downwardly to obstruct said entrance, means associated with said tripping device for normally holding said platform in raised position, a captive compartment having an entrance disposed above said tilting platform, said platform when swung downwardly constituting an approach to said last mentioned entrance.

2. In an animal trap, an enclosure having an entrance, a tread-operated tripping device in the bottom of said enclosure, a tilting platform pivoted above said tripping device and having a relatively heavy inner end adapted to swing said platform downwardly to obstruct said entrance, means associated with said tripping device for normally holding said platform in substantially horizontal position to define a chamber in the upper portion of said enclosure and a captive compartment having an entrance communicating with said chamber, said entrance being disposed above the forward portion of said platform, said platform when swung downwardly being disposed in inclined position to constitute an approach to said captive compartment entrance, resetting the trap when tilted back to substantially horizontal position by the weight of an animal disposed forwardly of the platform pivot.

3. In an animal trap, an enclosure having an entrance in the lower portion of one of the walls thereof, a tread-operated tripping device disposed inwardly of said entrance, a tilting platform pivoted above said tripping device and normally cooperating with the lower portion of said enclosure to form said entrance, the inner end of said platform being heavier than the outer end thereof to cause said platform to swing to an inclined position obstructing said entrance, means associated with said tripping device and normally holding said platform in substantially horizontal position, a captive compartment having an entrance disposed above said platform, said platform constituting an approach to said entrance when in the inclined position and swinging to horizontal position to reset the tripping device when an animal advances forwardly of the pivot of said platform.

4. In an animal trap, an enclosure having an entrance in the lower portion of one of the walls thereof, a confinement chamber in the upper and rear portion of said enclosure, a tread-operated trip device in the bottom of said enclosure, a tilting platform pivoted above said trip device normally disposed in horizontal position at substantially the level of the bottom of said confinement chamber, the inner end of said platform being heavier than the outer end to cause said platform to swing to inclined position obstructing said entrance, means associated with said tripping device for normally holding said platform in substantially horizontal position, and an entrance to said confinement chamber disposed adjacent the rear end of said platform and accessible to an animal after said animal has traveled the inclined platform to a point forwardly of the platform pivot.

5. In an animal trap, a relatively narrow box-like enclosure having an entrance adjacent the forward end thereof, a transverse partition dividing the upper portion of said enclosure and defining a confinement chamber therein, a tilting platform traversing the forward portion of said enclosure and pivoted on a horizontal axis some distance above the bottom of said enclosure, a tread-operated tripping device adapted to engage the rear end of said platform to normally hold said platform in substantially horizontal position and to release engagement with said platform when tread upon, the rear end of said platform being heavier than the forward end and adapted to swing said platform downwardly into inclined position obstructing said entrance and an entrance at the forward end of said confinement chamber disposed at the rear end of said platform, said entrance including means for preventing escape of an animal from said confinement chamber.

6. In an animal trap, an enclosure having an entrance, a tripping platform having a relatively heavy forward end disposed adjacent said entrance, a tilting platform pivoted above said tripping platform and having a relatively heavy rear end, said tripping platform carrying an arm adapted to engage and support the rear edge of said tilting platform in substantially horizontal position, a confinement chamber having an entrance above said tilting platform, and means associated with said entrance for preventing the escape of an animal from said chamber.

7. In an animal trap, an enclosure having an entrance in the forward portion thereof, a tread-operated tripping device at the bottom of said enclosure, a tilting platform pivoted above said tripping device and having a relatively heavy inner end adapted to swing said platform downwardly to obstruct said entrance, means associated with said tripping device for normally holding said platform in substantially horizontal position, said enclosure having an exit in the forward portion thereof above said tilting platform and a confinement chamber detachably connected to the wall of said enclosure wherein said exit is formed, said chamber having means associated with said exit for preventing escape of an animal from said chamber.

In testimony whereof I affix my signature.

THEODORE C. ENGLUND.